(12) United States Patent
Stenholt (10) Patent No.: US 12,285,723 B2
(45) Date of Patent: Apr. 29, 2025

(54) METHOD FOR FILTERING A DAIRY PRODUCT

(71) Applicant: Tetra Laval Holdings & Finance S.A., Pully (CH)

(72) Inventor: Jan Stenholt, Ans by (DK)

(73) Assignee: Tetra Laval Holdings & Finance S.A., Pully (CH)

( * ) Notice: Subject to any disclaimer, the term of this patent is extended or adjusted under 35 U.S.C. 154(b) by 693 days.

(21) Appl. No.: 17/764,241

(22) PCT Filed: Sep. 30, 2020

(86) PCT No.: PCT/EP2020/077419
§ 371 (c)(1),
(2) Date: Mar. 28, 2022

(87) PCT Pub. No.: WO2021/064053
PCT Pub. Date: Apr. 8, 2021

(65) Prior Publication Data
US 2022/0347628 A1 Nov. 3, 2022

(30) Foreign Application Priority Data
Oct. 1, 2019 (EP) ..................................... 19200930

(51) Int. Cl.
*B01D 61/12* (2006.01)
*B01D 61/22* (2006.01)

(52) U.S. Cl.
CPC ............. *B01D 61/12* (2013.01); *B01D 61/22* (2013.01); *B01D 2311/14* (2013.01);
(Continued)

(58) Field of Classification Search
CPC .... B01D 61/12; B01D 61/22; B01D 2311/14; B01D 2311/165; B01D 2311/20; B01D 2311/2523
See application file for complete search history.

(56) References Cited

U.S. PATENT DOCUMENTS

| 6,521,277 B1 | 2/2003 | Mortensen | |
|---|---|---|---|
| 2004/0167320 A1* | 8/2004 | Couto | C07K 1/34 530/412 |

(Continued)

FOREIGN PATENT DOCUMENTS

| CN | 104179753 A | 5/2014 |
|---|---|---|
| CN | 207493510 U | 6/2018 |

(Continued)

OTHER PUBLICATIONS

International Search Report mailed Dec. 1, 2020, for priority International Patent Application No. PCT/EP2020/077419.
(Continued)

*Primary Examiner* — Benjamin L Lebron
(74) *Attorney, Agent, or Firm* — Renner, Otto, Boisselle & Sklar, LLP (57) ABSTRACT

A method for filtering a dairy product is used in a filter system that includes at least one pump loop having a pump and a filter, with the pump being arranged to feed a feed product to the filter for filtering the feed product and outputting a permeate product and a retentate product. The method includes supplying the feed product to the pump at a feed pressure, during a first operational mode in which the feed pressure is below a first predefined threshold, controlling the pump to operate at a first power that is within a first percentage range of a maximum rated power of the pump, and during a second operational mode in which the feed pressure is above the first predefined threshold, controlling the pump to operate within a second percentage range of the maximum rated power which is higher than the first percentage range.

13 Claims, 4 Drawing Sheets

(52) U.S. Cl.
CPC .... *B01D 2311/165* (2013.01); *B01D 2311/20* (2013.01); *B01D 2311/2523* (2022.08)

(56) References Cited

U.S. PATENT DOCUMENTS

| | | | | |
|---|---|---|---|---|
| 2012/0060935 A1* | 3/2012 | Carter | ............... | F02D 19/023 |
| | | | | 137/511 |
| 2013/0040029 A1 | 2/2013 | Hoffmann | | |
| 2014/0346119 A1 | 11/2014 | Ammler et al. | | |
| 2020/0123986 A1* | 4/2020 | Hahn | ............... | G05D 7/0126 |
| 2021/0069647 A1* | 3/2021 | Asahi | ............... | B01D 65/00 |

FOREIGN PATENT DOCUMENTS

| | | | | | |
|---|---|---|---|---|---|
| EP | 2730330 | A1 | | 5/2014 | |
| WO | WO-03045530 | A1 | * | 6/2003 | ........... B01D 35/143 |
| WO | WO-2009035700 | A2 | * | 3/2009 | ............ B01D 61/14 |
| WO | 2011115498 | A1 | | 9/2011 | |

OTHER PUBLICATIONS

Extended European Search Report issued Mar. 26, 2020, for priority European Patent Application No. 19200930.6.

* cited by examiner

Fig. 4

METHOD FOR FILTERING A DAIRY PRODUCT

TECHNICAL FIELD

The invention relates to a method for filtering a dairy product using a filter system that filters a feed product and outputs a permeate product and a retentate product.

TECHNICAL BACKGROUND

Membrane filtration is used in the production of milk, such as in a reverse osmosis or nanofiltration process. In membrane filtration, the use of a pressure difference across the membrane is the driving force for separation of the feed product that is supplied to the filter. Membrane separation techniques may serve different purposes. In reverse osmosis, membrane separation may be used for dehydration of milk, whey, ultrafiltration permeate, and condensate. In nanofiltration, membrane separation may be used for partial desalination of milk, whey, ultrafiltration permeate or retentate.

A membrane filter system often includes two filter modules that are arranged in series to form a filter loop along with one retentate circulation pump and one permeate circulation pump. The feed product is pumped into the modules at a high flow rate and the operation of the membrane filter system depends on the pressure generated by the pumps used. The system includes both feed pumps and circulation pumps to move the feed product through the system. The capacity of the pumps is selected to match the required flow rate and characteristics of the module for a particular application. The speed of a circulation pump, or in certain applications, multiple circulation pumps, is conventionally controlled or adjusted according to a delta pressure on the filter loop. The delta pressure may be approximately four bar.

Conventional control methods are disadvantageous in that the pump may be operating at a higher power than is necessary to output the desired amount of filtered feed product. Typically, the pumps used in the filter system are oversized and have higher capacities than are required for the system to operate sufficiently. Accordingly, operation of the pumps at high speeds results in energy wasted during operation of the filter system. Still another disadvantage of conventional systems is that regulating the temperature in the system may further contribute to increased energy usage due to greater amounts of cooling being required to maintain the process temperature when the pumps are regularly operating at high speeds.

SUMMARY

It is an object of the invention to at least partly overcome one or more limitations of the prior art. In particular, it is an object to provide a method for filtering a dairy product that includes controlling operation of the circulation pumps based on determining whether feed pressure in the filter system is above or below a predefined threshold.

According to an aspect of the invention, a method for filtering a dairy product is used in a filter system that includes at least one pump loop having a pump and a filter, with the pump being arranged to feed a feed product to the filter for filtering the feed product and outputting a permeate product and a retentate product. The method includes supplying the feed product to the pump at a feed pressure, during a first operational mode in which the feed pressure is below a first predefined threshold, controlling the pump to operate at a first power that is within a first percentage range of a maximum rated power of the pump, and during a second operational mode in which the feed pressure is above the first predefined threshold, controlling the pump to operate within a second percentage range of the maximum rated power of the pump which is at least 10% higher than the first percentage range.

Herein, "power" is the rate with respect to time at which work is done by the pump (i.e. the time derivate of work: $P=dW/Dt$, where P is power, W is work, and t is time). That is, controlling the pump to operate at 100% power means that it pumps at its maximal performance. Power may herein also be referred to as "efficiency". Efficiency is then also defined as the rate with respect to time at which work is done by the pump.

The feed pressure has of course a pressure value that is sufficiently large to accomplish feeding the product. Obviously, the feed pressure is larger than zero in both operational modes. Typically, the feed pressure is a least 3 bar in the first operational mode.

In the second operational mode the feed pressure is higher than in the first operational mode, which is evident since the pump then operates at a power within the second percentage range, which is at least 10% higher than the first percentage range. In the second operational mode the feed pressure may be at least 5% higher than the feed pressure in the first operational mode.

The first operational mode may represent normal operation, i.e. filtering of the dairy product. The second operational mode may represent the start-up phase of the filtering, which typically lasts for a much shorter time than the first operational mode. The second operational mode may also represent cleaning of the filter. During cleaning a cleaning liquid may be supplied to the pump.

The method described herein is advantageous in controlling operation of the filter pumps to reduce an amount of energy that is used by operating the pumps in the filter system. At least one predefined feed pressure threshold may be set for a pump used in a particular application, such as a circulation pump used in a membrane separation filter for a reverse osmosis process or a nanofiltration process. When the feed pressure in the system is within one of the ranges defined above or below the predefined pressure threshold, the pumps are operable at a specific power that is within a percentage range of a maximum rated power of the pump. The power of the pump when the feed pressure is below the predefined pressure threshold may be approximately 25% and the power of the pump when the feed pressure is above the predefined pressure threshold may be in a percentage range that is between 25% and 85%. An upper threshold may also be predefined to represent a production set point for the pumps, such as 85%, which is the maximum power at which the pump is operable. In contrast, the pumps in conventional systems are adjusted according to the delta pressure on the filter loop which results in the pumps operating at much higher efficiencies than necessary for operation of the filter system. The speeds of the pumps are regularly increased resulting in the pumps drawing in more energy than is necessary to generate the desired output. The pumps in the filter system described herein are controlled based on an amount of feed pressure and are operated at lower speeds, as compared with conventional filter pump systems, to decrease the circulation in the filter loops while still generating the desired amount of filtered product and maintaining a constant output capacity. The speed of the pumps may not be increased until the feed pressure exceeds the predefined threshold and, after exceeding the predefined threshold, operation of the pumps will be limited when the pumps reach the production set point. Tests run in operating dairy product filtering systems have shown that the method can be successfully used while still maintaining the total filtering output during the majority of the time the production takes place.

Thus, the method and system described herein enables less energy to be wasted as compared with conventional filter systems and pump controls. Still another advantage of the energy efficient system described herein is that, due to the reduced pump energy during operation, an amount of cooling fluid used to regulate the temperature in the system is less as compared with conventional systems. Accordingly, using less cooling fluid enables an even further reduction in the overall energy used by the filter system. In a reverse osmosis application, still another advantage of the method described herein is that the levels of chemical oxygen demand (COD) in the outputted permeate product may be significantly reduced as compared with conventional systems.

Although various aspects of the invention are set out in the accompanying independent claims, other aspects of the invention may include any combination of features from the described features and/or the accompanying dependent claims with the features of the independent claims, and not only the combinations explicitly set out in the accompanying claims.

BRIEF DESCRIPTION OF THE DRAWINGS

Features of the invention will now be described, by way of example, with reference to the accompanying schematic drawings.

DETAILED DESCRIPTION

The method and system according to the present invention has particular application in membrane filter systems used in the production of dairy or milk products. More particularly, the method may be used in membrane filter systems or plants that are used for reverse osmosis, such as during dehydrating milk, whey, ultrafiltration permeate and condensate, or for nanofiltration, such as during partial desalination of milk, whey, ultrafiltration permeate or retentate.

The present invention pertains to a method for filtering a dairy product using a filter system that includes at least one pump loop having a pump and a filter, with the pump being arranged to feed a feed product to the filter for filtering the feed product and outputting a permeate product and a retentate product. The method includes supplying the feed product to the pump at a feed pressure, during a first operational mode in which the feed pressure is below a first predefined threshold, controlling the pump to operate at a first power that is within a first percentage range of a maximum rated power of the pump, and during a second operational mode in which the feed pressure is above the first predefined threshold, controlling the pump to operate within a second percentage range of the maximum rated power of the pump which is higher than the first percentage range.

Advantageously, the filter system is configured to output the desired amount of the filtered feed product while providing more energy efficient control of the circulation pumps that is based on feed pressure as compared with conventional systems that adjust the pump speeds based on the delta pressure in the filter loop. The speed of the circulation pumps is controlled according to the detected feed pressures in the system and at least one predefined threshold pressure level such that the circulation pumps do not operate at efficiencies which are higher than is necessary to achieve the desired output. The filter loops will have less circulation and the pumps will operate at efficiencies that are less than a maximum rated power for the particular pump, while still generating the desired amount of output for the filter system. Controlling the circulation pumps based on the feed pressure and the predefined threshold pressure levels enables the overall speed of the pumps to be reduced between 70% and 80% during an operation cycle, as compared with the higher speeds of pumps in conventional systems. In a reverse osmosis application, still another advantage of the method described herein is that the levels of chemical oxygen demand (COD) in the permeate product may be significantly reduced as compared with conventional systems.

Figure 1:
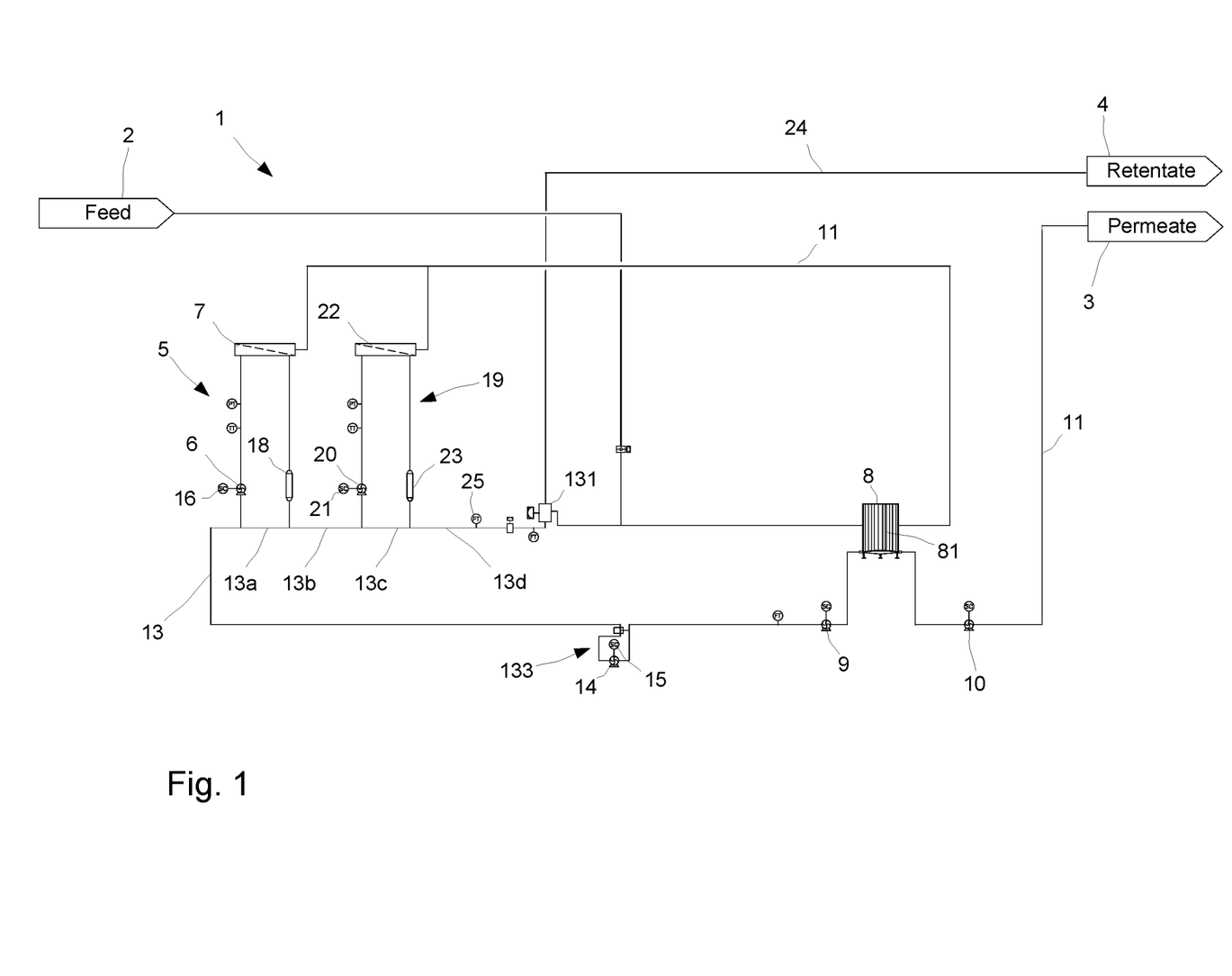
FIG. 1 is a schematic drawing of a membrane filter system used in milk production.

Referring first to FIG. 1, a filter system 1 for a dairy or milk product is shown. The filter system 1 includes a source for a feed product 2 to be filtered by the filter system 1 which outputs a permeate product 3, or the filtrate or the liquid passing through a membrane, and a retentate product 4, or the concentrate or the retained liquid. The feed product 2 may include whey, such as cheese whey, or milk or any other diary based product. The filter system 1 includes at least one pump loop or filter loop 5 having a circulation pump 6, which is also referred to as a booster pump, and a filter membrane 7 for separating the feed into permeate product 3 and retentate product 4. The filter loop 5 is arranged within the filter system 1 and fluidly connected between the source for the feed product 2 and lines for the retentate product 4 and the permeate product 3.

The filter loop 5 including the filter membrane 7 may be suitable for use in different systems or membrane filtration plants used in dairy processing. Membrane separation may be used in reverse osmosis for the dehydration of milk, whey ultrafiltration permeate, and condensate, and in nanofiltration for the partial desalination of milk, whey, ultrafiltration permeate, or retentate. The filter system 1 described herein may also be suitable for use with other filtration processes in still other applications. The pumps in the filter system 1 may be feed pumps or circulation pumps and the pumps may include different pump types such as centrifugal pumps or positive displacement pumps. The pumps may have different configurations and the configuration of the pumps will be dependent on the application. Multiple pumps may be arranged in series for a particular application.

The filter system 1 includes at least one tank 8 that is fluidly connected to the source for the feed product 2 for receiving the feed product. The at least one tank 8 has one compartment for feed product and another compartment for permeate product, which are separated by a wall 81 in the tank 8. The compartment for feed product is connected to a feed pump 9 and the compartment for permeate product is connected to a permeate pump 10 which is arranged to draw permeate from the tank 8. The permeate pump 10 is configured to pump the permeate product 3 in a permeate line 11 out of the filter system 1. The feed pump 9 pumps the feed product 2 to be filtered along a feed line 13 toward the filter loop 5. The feed line 13 includes a high pressure pump 14 and a frequency controller 15 to control the amount of electricity supplied to the high pressure pump 14. The circulation pump 6 for the filter loop 5 may also include a frequency controller 16. The feed line 13 has a flow by-pass pass circuit 133 that allows the high pressure pump 14 to be by-passed, such that only the feed pump 9 pumps the feed product 2. The filter system 1 may be supplemented with a cooling system integrated into the internal circulation loop for maintaining a process temperature that is between 10 and 50 degrees Celsius.

The filter loop 5 is a closed system and uses membrane separation for filtering the feed product 2. The filter membrane 7 of the filter loop 5 may be selected to have a desired separation characteristic such as one or more of a thickness, surface porosity, and pore diameter. The filter membrane 7 may be formed of any suitable material as desired for a particular application. In a reverse osmosis or nanofiltration process, the filter membrane 7 may be a polymeric membrane. A higher flow rate of the feed product 2 through the filter system 1 results in a higher shear at the membrane surface and a lower polarization effect. A pressure drop occurs between the retentate and permeate sides of the filter membrane 7 and the pressure drop corresponds to the force that pushes the permeate through the filter membrane 7. The feed product 2 may run parallel to the membrane surface and the permeate product 3 may flow perpendicular to the surface of the filter membrane 7 and up to the permeate line 11. The permeate line 11 flow out of the filter system 1 and back to the tank 8. At least one cooler 18 or multiple coolers may be arranged on the filter loop 5 to maintain the process temperature during operation.

More than one filter loop 5, 19 may be provided in the filter system 1 and the filter loops 5, 19 may be arranged in parallel such that each filter loop 5, 19 is fluidly connected between the feed line 13, and the permeate line 11 and a retentate line 24. The retentate line 24 may flow out of the filter system 1 or back to the tank 8. A valve 131 regulates how much of the retentate that exits the system 1 as retentate product 4 and how much goes back to the compartment for feed product in the tank 8. The retentate that goes back to the tank 8 then becomes the feed product that is pumped to the filter loops 5, 19. During operation of the system 1 a majority or all of the retentate goes back to the tank 8. The second filter loop 19 may be identical to the first filter loop 5 and also include a circulation pump 20, a frequency controller 21 for the circulation pump 20, a filter membrane 22, and a cooler 23. The circulation or capacity in the filter loops 5, 19 may be controlled identically in that the operation of the circulation pumps 6, 20 may be synchronous or nearly synchronous. Various sensors, such as pressure sensors, temperature sensors and flow meters, may also be arranged in the filter system 1. Advantageously, the feed pressure 25 may be detected in the feed line 13 of the filter system 1 by a feed pressure sensor for controlling the circulation pumps 6, 20 in response to the detected feed pressure. The feed pressure 25 generated in the filter system 1 is a combination of both the pressure generated by the feed pump 9 and generated by the high pressure pump 14 that pumps the feed product up to the circulation pumps 6, 20.

Figure 2:
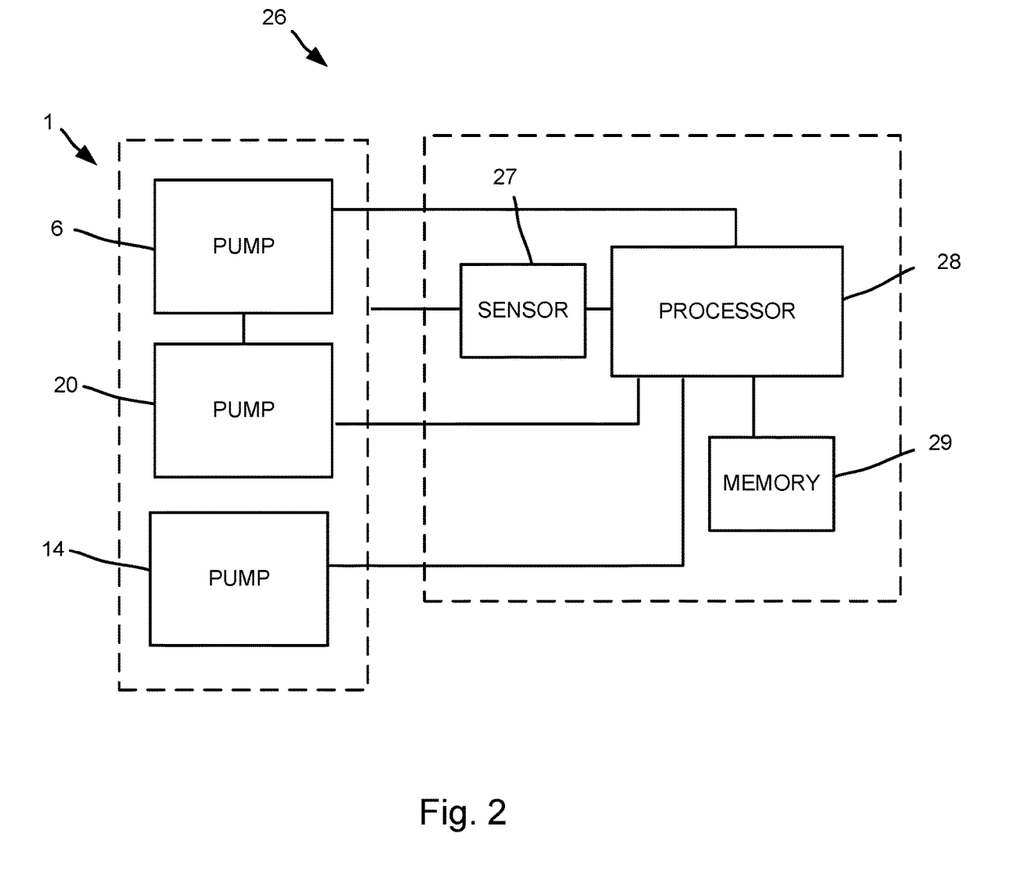
FIG. 2 is a schematic drawing of a control system for the membrane filter system of FIG. 1.

Referring in addition to FIG. 2, the filter system 1 includes a control system 26 to control the operation of the circulation pumps 6, 20 based on the feed pressure 25 in the filter system 1. In contrast to conventional systems in which the speed of the circulation pumps 6, 20 is adjusted according to a delta pressure on the filter loop 5, 19, the control system 26 may control the circulation pumps 6, 20 based on determining whether the feed pressure 25 is within a range defined by at least one predefined pressure threshold. The circulation pumps 6, 20 are operable at specific speeds, which correspond to efficiencies of the circulation pumps 6, 20 based on the feed pressure 25 in the filter system 1.

The control system 26 may include a feed pressure sensor 27 to detect the feed pressure 25, a computer or processor 28, and a memory 29 in which the predefined pressure threshold data is stored. The memory 29 and the feed pressure sensor 27 for the feed pressure 25 are communicatively coupled to the processor 28 for communication therewith. The processor 28 may comprise any suitable electronic control mechanism, such as for example a central processing unit (CPU), microprocessor, control circuitry, and the like. Based on the detected feed pressure, the processor 28 controls the at least one circulation pump 6, 20 and the high pressure pump 14 may also be controlled by the control system 26. If more than one filter loop and circulation pump is provided, as shown in FIG. 1, the circulation pumps 6, 20 are operated together and the high pressure pump 14 is operated separately from the circulation pumps 6, 20. The control system 26 is used to control the operation of the at least one circulation pump 6, 20 based on the feed pressure, enabling the circulation pump 6, 20 to run at lower efficiencies as compared with conventional systems which operate the pumps at higher speeds that are not necessary to achieve the same output generated by the filter system 1 described herein.

Figure 3:
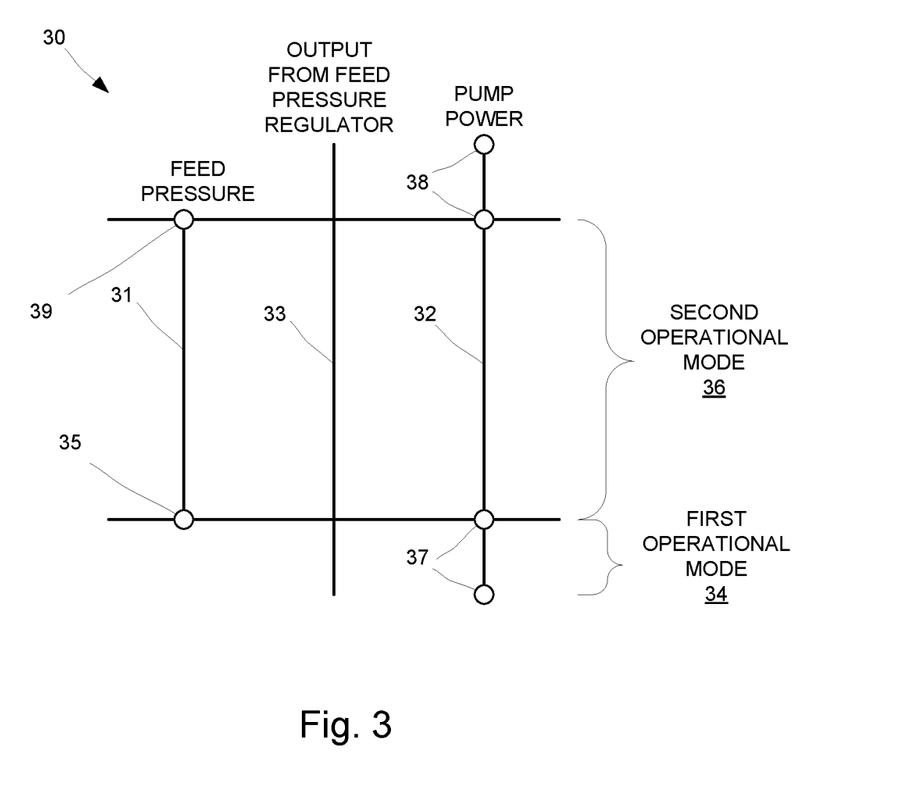
FIG. 3 is a schematic drawing showing data representing the parameters used for regulating the speed of circulation pumps in the membrane filter system of FIG. 1.

Referring in addition to FIG. 3, the control system 26 is configured to carry out a method of regulating the speed of the circulation pumps 6, 20 using data 30 representing the parameters for a particular application. The data 30 may be stored in the memory 29 and the processor 28 is configured to execute commands based on the stored data 30. The data 30 includes parameters pertaining to the feed pressure in the feed line 13 (as shown in FIG. 1), as represented by line 31, and the output to the circulation pumps 6, 20 or the pump power, as represented by line 32. The total feed pressure in the feed line 13 is increased by the high pressure pump 14, or the feed pressure regulator, such that the output to the circulation pumps 6, 20 may be higher than the initial feed pressure in the filter system 1, such as by four bar. As shown in FIG. 3, the pressure output from the feed pressure regulator may be higher than the maximum feed pressure along the line 31 representing the feed pressure. The output from the feed pressure regulator is represented by line 33.

The data 30 includes parameters that are used to define when the at least one circulation pump 6, 20 is in a first operational mode 34. The at least one circulation pump 6, 20 may be in the first operational mode 34 when the feed pressure 25 in the feed line 13 is below a first predefined threshold 35 and in a second operational mode 36 when the feed pressure in the feed line 13 is above the first predefined threshold 35. When in the first operational mode 34, the at least one circulation pump 6, 20 may operate or rotate at a first power 37 that is a percentage of a maximum rated power of the circulation pump 6, 20, i.e. 100%. The first operational mode 34 defines a first percentage range of the maximum rated power of the circulation pump 6, 20. The first power 37 may be in a first percentage range that is between 20% and 60%. The first power 37 may be 25%. When the feed pressure 25 is below the first predefined threshold 35, the circulation pump 6, 20 may operate at the same first power 37 for any feed pressure. The circulation pumps 6, 20 may be operated in the first operational mode 34 at the first power 37 when the feed pressure in the filter system 1 is detected to be any value between 5 and 20 bar. The pressure values and pump efficiencies described herein are merely exemplary and the system may have different ranges and parameters as suitable for different applications.

When the system or plant needs more pressure and the feed pressure 25 reaches the first predefined threshold 35, the control system 26 may be configured to increase the speed of the circulation pumps 6, 20 such that the circulation pumps 6, 20 are operable in the second operational mode 36 that is defined as a second percentage range between the first power 37 and a second power 38 that is higher than the first power 37. The circulation pumps 6, 20 may operate at any power within the second percentage range between the first power 37 and the second power 38. The flow rate of the feed product 2 may increase by at least 70% during the second operational mode 36. The second power 38 may be between 80% and 90% of the maximum rated power of the circulation pump 6, 20. The second power 38 may be 85% and the second power 38 may be the maximum operating power for the circulation pumps 6, 20. Accordingly, the circulation pumps 6, 20 will never operate at a higher power than the second power 38 and the maximum operating power will always be below 100%. The operating range for the circulation pumps 6, 20, when in the second operational mode 36, may be any power between 25% and 85% when the feed pressure 25 is between 20 and 34 bar.

The circulation pumps 6, 20 may be held to operate at the second power 38 for any feed pressure 25 that is above the feed pressure at a second predefined threshold 39 which may be set to be a production set point for the circulation pumps 6, 20. The production set point may be set to be 85% power. If the feed pressure 25 is greater than the second predefined threshold 39, the circulation pumps 6, 20 may remain operable at 85% power. The second predefined threshold 39 may correspond to a pressure that is 34 bar or between 34 and 36 bar. The circulation pump 6, 20 may be operable at a minimum power of 80% when the feed pressure is 34 bar or more. Accordingly, the circulation pumps 6, 20 effectively has only two operational modes 34, 36 which are dependent on the feed pressure, in contrast to being dependent on the delta pressure in the filter loop 5, which is around four bar in conventional systems. As the circulation pump 6, 20 will be held to lower efficiencies during certain pressure increases, and held to never reach 100% power, the filter system 1 will use less energy. Using the control system 26 also enables the cooler 18 and other cooling components in the filter system 1 to operate at lower energy levels or supply less cooling fluid during operation of the filter system 1 since the average process temperature during operation is lower due to the controlled operation of the circulation pumps 6, 20.

Prior to reaching the first operational mode 34, the filter system 1 may additionally have a start-up mode during which the circulation pumps 6, 20 may operate at an initially higher power as compared with the power during the first operational mode 34, such as between 70% and 80%. The speed of the circulation pumps 6, 20 during the start-up mode may be increased until the feed pressure 25 reaches a value that is within the range for the first operational mode 34, such that the speed of the circulation pumps 6, 20 may stop increasing and the circulation pumps 6, 20 are operable in the first operational mode 34 at the first power 37. The feed pressure 25 may be 5 bar when the circulation pumps 6, 20 are operable in the first operational mode 34 at the first power 37, which may be 25%, after the initial start-up.

In an exemplary application, a feed capacity for a given period of time for the filter system 1 may be approximately 10,000 liters in the feed line 13 and the filter system 1 or plant may take out 2000 liters of the permeate product 3, such that 2000 liters flows out of the filter loop 5 (and loop 19 if used) and up to the permeate line 11, and 8000 liters of the remaining product flows to the second filter loop 19. When more feed pressure is needed in the filter system 1, the flow rate provided by the circulation pumps 6, 20 is changed by the control system 26. The flow rate in the filter loops 5, 19 may be lower as compared with conventional systems in which the flow rate increases with the increased pressure. The filtration effect and the output in the filter system 1 are not impacted by the lower flow rate. The first filter loop 5 may include a feed line portion 13*a* that is operable at 90% and a feed line portion 13*b* that is fluidly connected from the first filter loop 5 to the second filter loop 19 to output 10% to the pump 20. A feed line portion 13*c* of the second filter loop 19 is also operable at 90% and a feed line portion 13*d* is operable at 10% and is fluidly connected to the retentate line 24. Accordingly, the circulation in each of the filter loops 5, 19 is the same and the desired capacity of the output is maintained. The circulation in each the loops 5, 19, and hence in portions 13*a*, 13*c*, may be 4 to 10 times higher than the circulation in the feed line 13, or even higher than that.

Figure 4:
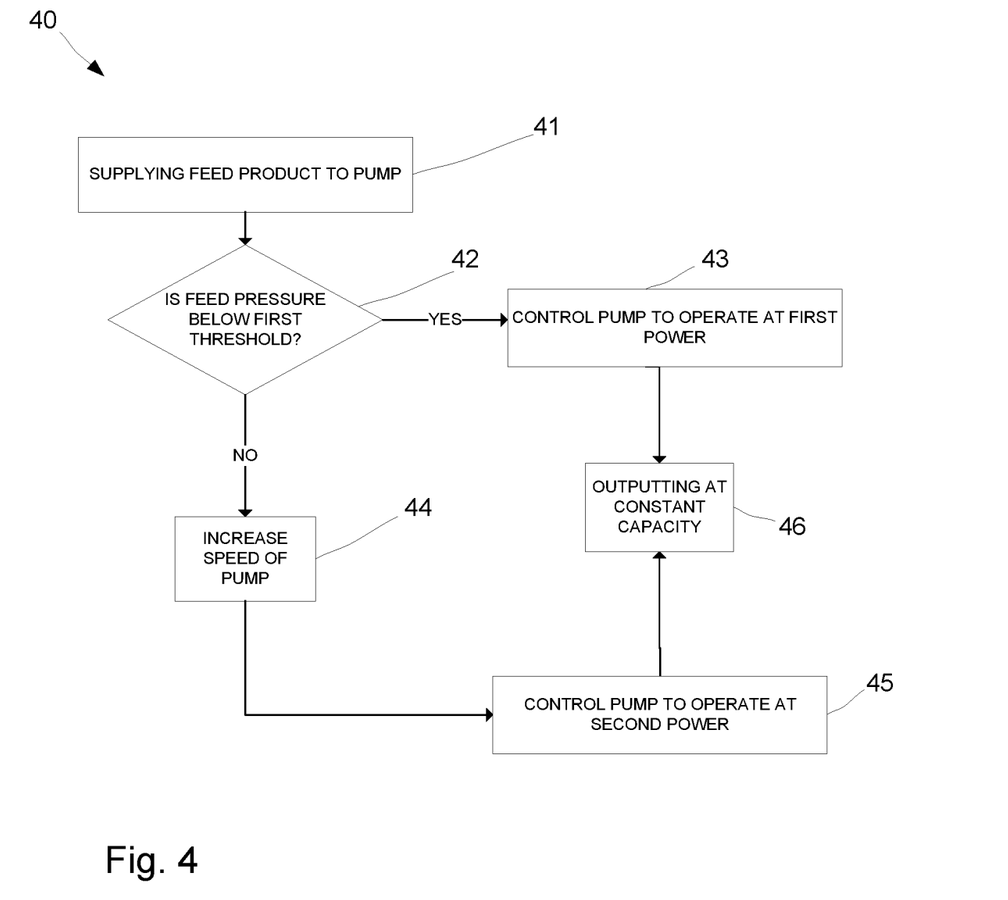
FIG. 4 is a flow chart of a method for filtering a dairy product using a membrane filter system, such as the membrane filter system of FIG. 1.

Referring in addition to FIG. 4, a flowchart for a method 40 of filtering a dairy product using the filter system 1 of FIG. 1 and the control system of FIG. 2 is shown. The control system 26 may include a non-transitory computer readable medium having a program stored thereon for carrying out the method 40 when executed by a computer or the processor 28 (as shown in FIG. 2). The method 40 includes supplying 41 the feed product 2 to the at least one circulation pump 6, 20 at the feed pressure 25 (as shown in FIG. 1) and determining 42 whether the feed pressure 25 is below the first predefined threshold 35 (as shown in FIG. 3). The method 40 may include supplying the feed product 2 to the at least two filter loops 5, 19 that are fluidly connected between the feed line 13, the permeate line 11, and the retentate line 24 (as shown in FIG. 1).

If the control system 26 determines that the feed pressure 25 is below the first predefined threshold 35, the method 40 includes controlling 43 the circulation pump 6, 20 to operate at the first power 37 that is within the first percentage range of a maximum rated power of the circulation pump 6, 20 during the first operational mode 34 (as shown in FIG. 3). If the control system 26 determines that the feed pressure 25 is above the first predefined threshold 35, the method 40 includes increasing 44 the speed of the circulation pump 6, 20 and controlling 45 the circulation pump 6, 20 to operate within the second percentage range of the maximum rated power of the circulation pump 6, 20 which is higher than the first percentage range during the second operational mode 36 (as shown in FIG. 3). The second percentage range is defined between the first power 37 and the second power 38 (as shown in FIG. 3). The method 40 may further include defining the first predefined threshold 35 to be between 15 and 25 bar and defining a second predefined threshold 39 (as shown in FIG. 3) that represents the production setpoint for the circulation pump 6, 20 such that the circulation pump 6, 20 will not operate at an power that is higher than the second power 38.

The method 40 may include operating the circulation pump 6, 20 at a maximum power of 60% during the first operational mode 34 when the feed pressure 25 is in a range that is between 5 and 30 bar. The method 40 may include increasing the flow rate of the feed product 2 by at least 70% during the second operational mode 36 and operating the circulation pump 6, 20 in the second percentage range that is between 25% and 85% power during the second operational mode 36 when the feed pressure is between 20 and 34 bar. The circulation pump 6, 20 may be operable at a minimum power of 80% when the feed pressure is 34 bar or more. Using the control system 26, the method 40 also includes outputting 46 a constant capacity of the filtered feed product from the filter system 1 and operating the circulation pumps 6, 20 of the at least two filter loops 5, 19 to have a common flow rate in the filter loops 5, 19. The pressure values and pump efficiencies described herein are merely exemplary and different ranges may be used as suitable for different applications.

A method for filtering a dairy product is used in a filter system that includes at least one pump loop having a pump and a filter, with the pump being arranged to feed a feed product to the filter for filtering the feed product and outputting a permeate product and a retentate product. The method includes supplying the feed product to the pump at a feed pressure, during a first operational mode in which the feed pressure is below a first predefined threshold, controlling the pump to operate at a first power that is within a first percentage range of a maximum rated power of the pump, and during a second operational mode in which the feed pressure is above the first predefined threshold, controlling the pump to operate within a second percentage range of the maximum rated power of the pump which is higher than the first percentage range.

The method may include defining a second predefined threshold for the feed pressure, where the second predefined threshold is higher than the first predefined threshold.

The method may include outputting a constant capacity of the filtered feed product from the filter system. In other words, the method may comprise outputting from the filter system a constant flow of product that has passed through the filter.

The method may further comprise, during the second operational mode, controlling the pump to operate at a power of the pump that increases the flow rate of the feed product by at least 70% during the second operational mode, as compared with the flow rate during the first operational mode.

The method may include defining the first predefined threshold to be between 15 and 25 bar.

The method may include operating the pump at maximum 35% power during the first operational mode. Alternatively, the method may include operating the pump at maximum 60% power during the first operational mode.

The method may include operating the pump at maximum 35% power when the feed pressure is in a range that is between 5 and 30 bar. Alternatively, the method may include operating the pump at maximum 60% power when the feed pressure is in a range that is between 5 and 30 bar.

The method may include operating the pump in the second percentage range that is between 25% and 85% power during the second operational mode.

During the first operational mode the first percentage range may be from 40% to 60%, that is the pump is then operated at a power that is between 40% and 60% of its maximal power. During the second operational mode the second percentage range may be at least 70%, that is the pump is then operated at a power that is at least 70% and 60%. The method may include operating the pump in the second percentage range when the feed pressure is between 20 and 34 bar.

The method may include operating the pump at minimum 80% power when the feed pressure is 34 bar or more.

The method may include supplying the feed product to the filter assembly including at least two pump loops that are fluidly connected between a feed line, a permeate line, and a retentate line.

The method may include operating the pumps of the at least two pump loops to have a common flow rate in the at least two pump loops.

A non-transitory computer readable medium may have stored thereon a program which, when executed by a computer, carries out the filtration method described herein.

While the invention has been described with reference to one or more preferred features, which features have been set forth in considerable detail for the purposes of making a complete disclosure of the invention, such features are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention.

The invention claimed is:

1. A method for filtering a dairy product using a filter system that includes at least one pump loop having a pump and a filter, the pump being arranged to feed a feed product to the filter for filtering the feed product and outputting a permeate product and a retentate product, the method comprising:
supplying the feed product to the pump at a feed pressure;
during a first operational mode in which the feed pressure is below a first predefined threshold, controlling the pump to operate at a first power that is within a first percentage range of a maximum rated power of the pump; and
during a second operational mode in which the feed pressure is above the first predefined threshold, controlling the pump to operate within a second percentage range of the maximum rated power of the pump which is at least 10% higher than the first percentage range.

2. The method according to claim 1 further comprising defining a second predefined threshold for the feed pressure, the second predefined threshold being higher than the first predefined threshold.

3. The method according to claim 1 further comprising outputting from the filter system a constant flow of product that has passed through the filter.

4. The method according to claim 1 further comprising, during the second operational mode, controlling the pump to operate at a power of the pump that increases the flow rate of the feed product by at least 70% during the second operational mode, as compared to the flow rate of the feed product during the first operational mode.

5. The method according to claim 1 further comprising defining the first predefined threshold to be between 15 and 25 bar.

6. The method according to claim 1 further comprising operating the pump at maximum 60% power during the first operational mode.

7. The method according to claim 6 further comprising operating the pump at maximum 35% power when the feed pressure is in a range that is between 5 and 30 bar.

8. The method according to claim 1 further comprising operating the pump in the second percentage range that is between 25% and 85% power during the second operational mode.

9. The method according to claim 8 further comprising operating the pump in the second percentage range when the feed pressure is between 20 and 34 bar.

10. The method according to claim 1 further comprising operating the pump at minimum 80% power when the feed pressure is 34 bar or more.

11. The method according to claim 1, wherein the pump loop is a first pump loop, and the filter system comprising a second pump loop having a second pump and a second filter, the second pump being arranged to feed the feed product to the second filter for filtering the feed product and outputting a permeate product and a retentate product, the method further comprising supplying the feed product to the filter assembly including the two pump loops, which are fluidly connected between a feed line, a permeate line, and a retentate line.

12. The method according to claim 11 further comprising operating the pumps of the at least two pump loops to have a common flow rate in the at least two pump loops.

13. A non-transitory computer readable medium having stored thereon a program which, when executed by a computer, carries out the method according to claim 1.

* * * * *